US005810032A

United States Patent [19]
Hong et al.

[11] Patent Number: 5,810,032

[45] Date of Patent: Sep. 22, 1998

[54] METHOD AND APPARATUS FOR CONTROLLING THE DISTRIBUTION OF TWO-PHASE FLUIDS FLOWING THROUGH IMPACTING PIPE TEES

[75] Inventors: Ki Choong Hong; Suzanne Griston, both of Bakersfield, Calif.

[73] Assignee: Chevron U.S.A. Inc., Richmond, Calif.

[21] Appl. No.: 408,587

[22] Filed: Mar. 22, 1995

[51] Int. Cl.[6] ........ F16L 41/02

[52] U.S. Cl. ........ 137/561 A; 137/1

[58] Field of Search ........ 137/1, 561 R, 137/561 A; 366/336; 166/90.1; 261/20, 76; 138/39, 44; 285/156

[56] References Cited

U.S. PATENT DOCUMENTS

| | | | |
|---|---|---|---|
| 2,227,716 | 1/1941 | Ingham | 285/156 |
| 4,269,211 | 5/1981 | Howard et al. . | |
| 4,516,986 | 5/1985 | Jepsen . | |
| 4,522,218 | 6/1985 | Konak . | |
| 4,574,827 | 3/1986 | Konak . | |
| 4,574,837 | 3/1986 | Aggour et al. . | |
| 4,662,391 | 5/1987 | Tolley . | |
| 4,824,614 | 4/1989 | Jones . | |
| 5,010,910 | 4/1991 | Hickey . | |
| 5,040,558 | 8/1991 | Hickey et al. . | |
| 5,094,103 | 3/1992 | Wicks, III et al. . | |
| 5,407,274 | 4/1995 | Woerheide et al. | 137/561 A |
| 5,472,050 | 12/1995 | Rhoten et al. . | |

FOREIGN PATENT DOCUMENTS

| | | | |
|---|---|---|---|
| 0221487 | 8/1994 | Japan | 285/156 |
| 7611253 | 4/1978 | Netherlands | 285/156 |
| 0625090 | 9/1978 | U.S.S.R. | 285/156 |
| 0871561 | 6/1961 | United Kingdom | 137/561 A |

OTHER PUBLICATIONS

Azzopardi et al., "Annular Two–Phase Flow Split at an Impacting T", Int. J. Multiphase Flow, vol. 13, No. 5, pp. 605–614 (1987).

Chien and Rubel, "Phase Splitting of Wet Stream in Annular Flow Through a Horizontal Impacting Tee", SPE Prod. Engr., pp. 368–374, Nov. 1992.

Hong, "Two–Phase Flow Splitting at a Pipe Tee", J. Pet. Tech., pp. 290–295, Feb. 1978.

Jones and Williams, "A Two–Phase Flow–Splitting Device That Works", SPE Prod. & Facil., pp. 197–202, Aug. 1993.

Strome and McStravick, "Continuous Stream Quality Measurement in a Steam Distribution System Quality Measurement", SPE Prod. Engr., pp. 259–267, Apr. 1987.

*Primary Examiner*—Christopher Verdier
*Attorney, Agent, or Firm*—Burns, Doane, Swecker & Mathis, L.L.P.

[57] ABSTRACT

A method and apparatus is disclosed for splitting two-phase liquid-gas flow (e.g., air-water, hydrocarbon gas-condensate, or wet steam) at an impacting pipe-tee junction in a fluid distribution network to maintain constant ratios of liquid mass flow rate to gas (or vapor) mass flow rate entering and exiting the tee junction. Specific mechanical modification of normal impacting tees has been found to significantly increase the range of vapor-phase split ratio for which equal vapor-liquid split ratios (or quality) can be achieved and maintained. In one embodiment, a pre-separator vane is inserted in the entrance arm of the impacting tee. In a second embodiment, nozzles are installed in the exit arms of the impacting tee. In a third embodiment, the impacting tee diameter is increased above that of the surrounding piping leading into and away from the tee junction such that the vapor phase velocity entering the tee junction is less than or equal to 20 ft/sec. In another embodiment, the impacting tee is modified with a combination of two or more of the methods described above.

10 Claims, 13 Drawing Sheets

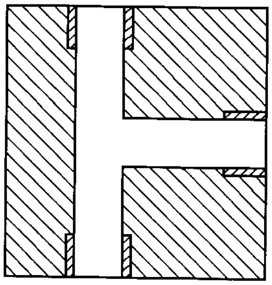
FIG. 4A
(PRIOR ART)
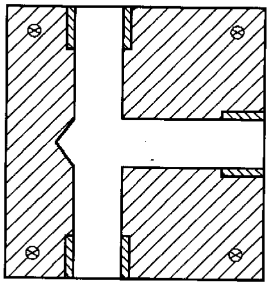
FIG. 4B
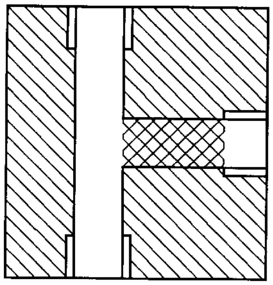
FIG. 4C
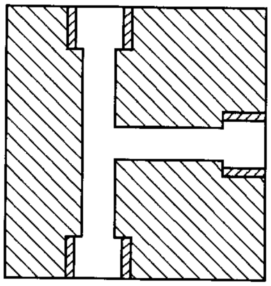
FIG. 4D
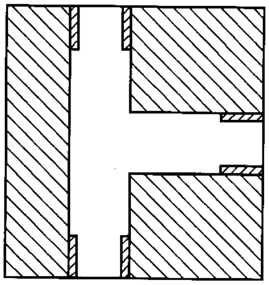
FIG. 4E
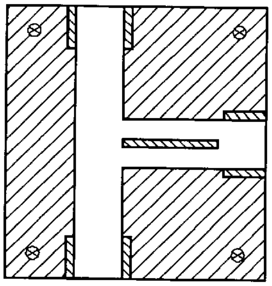
FIG. 4F
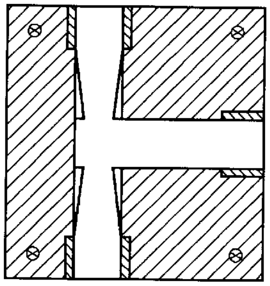
FIG. 4G
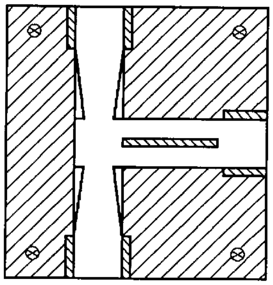
FIG. 4H
FIG. 4

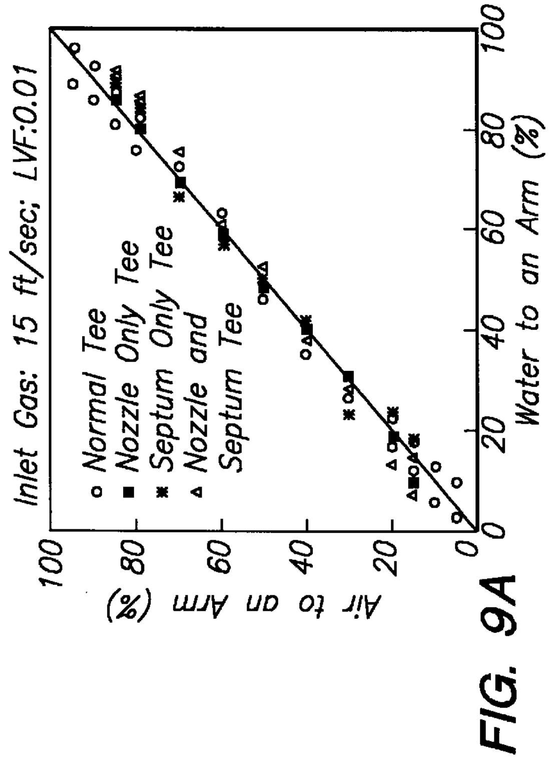
FIG. 9A
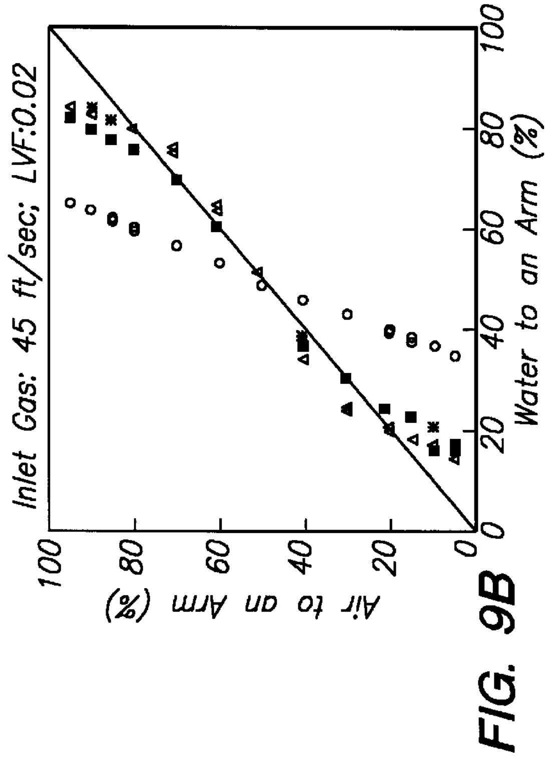
FIG. 9B
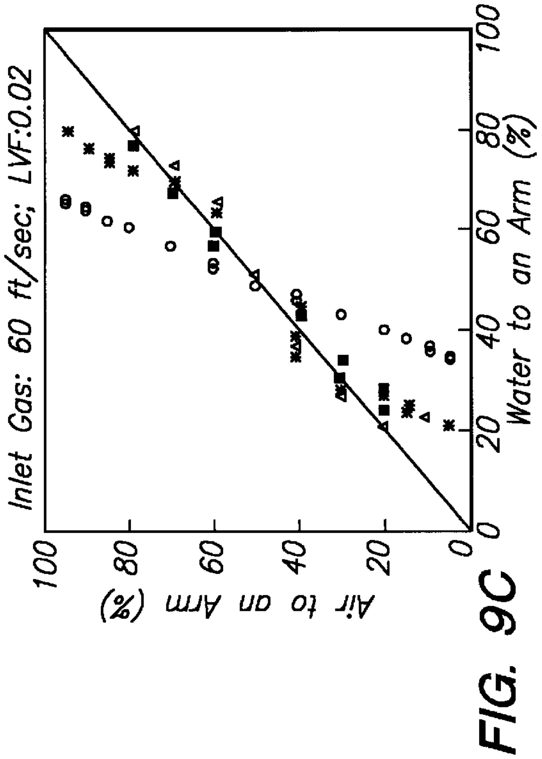
FIG. 9C
Test Conditions:
Pipe ID: 3/4-in.
Fluid: Air-Water
Horizontal Impact Tee
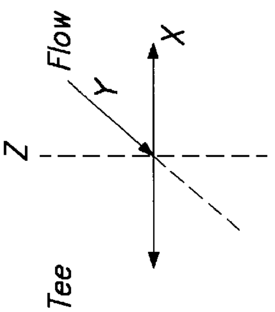

METHOD AND APPARATUS FOR CONTROLLING THE DISTRIBUTION OF TWO-PHASE FLUIDS FLOWING THROUGH IMPACTING PIPE TEES

FIELD OF THE INVENTION

The present invention relates to the distribution of two-phase fluids (e.g., gas-liquid, wet steam) in piping networks. One application of the invention is the control of two-phase steam in oil field piping networks and nuclear power plant cooling systems. Another application of the invention is the control of gas-condensate in natural gas distribution networks. In both of these applications, one needs to control the amounts of liquid and vapor distributed to each branch of a piping network to optimize heat and/or mass distribution.

BACKGROUND OF THE INVENTION

In the petroleum industry, for example, steamflooding involves the injection of heat into a reservoir using two-phase steam. For the process to be effective, two-phase (wet) steam of a sufficient quality (or vapor mass fraction) must be supplied to injection wells at sufficient rates to distribute heat and mass uniformly throughout the steamflood area and maximize displacement efficiency and volumetric sweep of the hydrocarbon reservoir. Since the mechanisms by which the vapor and liquid phases displace hydrocarbons in a reservoir differ, it is also important to maintain optimum steam quality entering the reservoir. This requires the delivery of steam at a predetermined quality to a given injection wellhead at a predetermined rate.

Oil field steam distribution systems or networks are designed to deliver specified amounts of steam to each injection well in the network. Two-phase steam, consisting of liquid and vapor phases, is generated by pumping pressurized, filtered water through either a conventional single-pass oil- or gas-fired boiler unit or through a gas-fired heat recovery unit of a cogeneration system. The steam is then distributed through a piping network to individual injection wells. Steam chokes are typically used to control rates to each injection well. The steam passes through a choke restriction (or bean) under critical flow conditions at a rate determined by the steam pressure upstream of the choke inlet and the size of the bean opening. Impacting (dead-end) tees are used at pipe branches in an attempt to achieve uniform (or equal) quality distribution to each well. Unfortunately, unequal splitting of the liquid and vapor phases can occur at tee junctions under certain steam flow conditions, resulting in non-optimum distributions of steam mass, vapor/liquid ratio, and heat over a steamflood project area.

Wellhead quality and rate measurements collected in various steamflood projects and in steam flow splitting tests indicate that uneven quality splits often occur whenever the mass flow rate splits deviate from a 50%—50% split at the exit branches of the pipe tee. Individual wells thus receive non-uniform (or uneven) and unknown (or unpredictable) distributions of the steam liquid and vapor. Uneven liquid and vapor phase distributions result in poor displacement efficiency and volumetric sweep of the reservoir while unknown liquid and vapor phase distributions (e.g., unknown quality and rate distribution) leads to inefficient project management and increased operating expenses. Therefore, it is important to develop an apparatus and method to equalize and/or control the qualities of the split streams.

The two-phase flow splitting behavior at tee junctions has been studied by many investigators. However, very limited data is available for flow splitting in impacting tees. The majority of these studies have involved laboratory air-water experiments. Only one impacting tee study has been conducted using two-phase steam; Chien et al., "Phase Splitting of Wet Steam in Annular Flow through a Horizontal Impacting Tee", SPE Production Engineering, Nov. 1992, pp 368–374. In 1978, results from laboratory air-water experiments for flow splitting at side-arm and impacting (dead-end) tee configurations indicated that the percentage of water split to each exit branch (or arm) of the impacting tee was equal to the corresponding percentage of air split to each branch provided that the air split ratio does not exceed 5:1 (85%–15% split or 15%–85% split); Hong, "Two-Phase Flow Splitting at a Pipe Tee" J. Pet. Tech., Feb. 1978, pp 290–295.

As a result of this study, impacting pipe tees have been used widely in California's steamflood projects. However, recent wellhead steam flow rate and quality measurements, using pressurized vessels to separate and meter the liquid and vapor phases, indicate that uneven quality splits commonly occur as a result of uneven vapor flow rate splits. Consequently, wellhead steam qualities were found to vary from 20% to 90%. The main reason for the discrepancy between the field data and the laboratory findings is that the air-water tests were run at a single set of inlet flow conditions: air velocity of 90 ft/sec and liquid volume fraction of 0.009. Steam conditions at injectors in a typical steamflood area can vary from 500 to 1000 psia pressure, 100 to 1000 barrels per day (B/D) flow rate, and 20% to 90% quality. These conditions result in vapor velocities ranging from 5 to 70 ft/sec and liquid volume fractions ranging from 0.01 to 0.15 entering the pipe tee. More recent studies involving air-water or wet-steam flow through impacting tees also showed that uneven quality splits occur when the vapor flow rate split to each branch deviates from a 50%—50% split. Results from these studies additionally showed that the tee branch with the lower vapor flow rate also received the lower quality steam (i.e., higher liquid volume fraction).

Prior art attempts to solve the problem of unequal quality splits include separating the liquid and vapor phases at the generator outlet and recombining them at each wellhead. Once separated, the single-phase fluids can be accurately metered and controlled to each well. However, this method requires dual piping networks, one for the liquid phase and another for the vapor phase, to distribute steam to the individual wells. In addition, a means to treat the vapor line was required to reduce high corrosion problems. For these reasons, this method has not been widely used. Other devices and methods have been tested and, in some cases, installed extensively in the field to equalize the qualities of split streams. Notable ones include:

1. A vertical distribution pot and a homogenizing orifice;
2. Orifice devices inserted upstream and downstream of the tee junction; and
3. A static mixer and stratifier inserted upstream of a branching tee.

The first device, requires elaborate equipment that can be expensive if used at every tee junction in a typical steam distribution network. The orifice devices installed at the tee junction, at first, appeared to provide a low pressure-drop means for mixing the liquid and vapor phases to improve quality splits. However, field application of these devices revealed that they are not effective at all flow conditions. The third device, originally designed for side-armed tees and later adopted for impacting tees, has been reported to improve quality splits when installed in an actual steam distribution system. However, recent field tests showed that the mixer stratifier device is limited in its ability to improve the quality splits to each arm and, in fact, tends to split the liquid-phase equally to each arm, independently of the vapor-phase split. In addition, the mixer stratifier device is susceptible to plugging as it captures scales and other debris in the flow lines.

Numerous patentable devices have been developed in recent years to improve two-phase flow splitting in piping networks. See for example, U.S. Pat. Nos. 4,269,211; 4,516,986; 4,522,218; 4,574,827; 4,574,837; 4,662,391; 4,824,614; 5,010,910; and 5,040,558. However, the majority of the devices are designed for side-arm tees and the remainder of the devices are designed for splitting two-phase fluids to three or more exit branches. Some of the side-arm tee devices may be modified for an impacting tee configuration. However, these devices are often complex and expensive and have limited effectiveness in providing uniform vapor-liquid split ratios for impacting tees.

Based on the state of the art, it is apparent that data for a wider range of flow conditions are needed to adequately evaluate the splitting of vapor and liquid phases at impacting tees. Furthermore, a simple, reliable, low-cost device is needed for splitting wet steam or other two-phase liquid-vapor flows to achieve uniform qualities to each pipe branch exiting the tee.

SUMMARY OF THE INVENTION

Laboratory air-water and field steam flow tests were conducted to: 1) obtain a better understanding of two-phase flow splitting at impacting tees and (2) find tee insert devices that increase the vapor-phase split ratio for which split qualities (vapor mass fraction) to each pipe branch are equal. Various impacting tee-insert devices were evaluated in the laboratory over a wide range of two-phase, air-water flow conditions. The two "best" devices (pre-separator vane and downstream nozzles) determined from laboratory tests were then field tested, along with an off-the-shelf mixer stratifier device, to determine which device(s), if any, improve quality splits over a wide range of steam flow conditions.

Of the three insert devices that were field tested, the nozzles produced equal-quality splits over the widest range of vapor-phase split ratio. The pre-separator vane also improved quality-splits, but over a somewhat smaller range. Field steam flow results for the pre-separator vane and nozzle inserts were very consistent with laboratory findings. The off-the-shelf mixer stratifier tee was found to split the liquid-phase equally to each arm regardless of the vapor-phase split. Consequently, the quality splits became more uneven when the mixer stratifier insert was used. In addition, field steam flow tests also showed that an enlarged diameter tee, used to reduce the vapor velocity to below 20 ft/sec, also equalized the qualities of split streams.

Accordingly, the present invention involves the modification of standard impacting pipe tees to significantly improve the splitting of two-phase flow (e.g., wet steam, air-water, hydrocarbon gas-condensate) such that the ratio of the mass flow rates of the liquid and vapor (or gas) phases split to each branch of the tee are equal to the liquid-vapor ratio entering the tee. The present invention overcomes the flow splitting problems previously mentioned for flow rate splits ranging from a 50%—50% split to a 5%–95% split by one or more combinations of the following means:

1. An insert (or pre-separator vane) installed in the inlet arm of the tee divides the gas and liquid phases approximately equally into the two upstream chambers as the fluid enters the tee junction. For example, with a 30%–70% gas flow rate split, 40% of the gas in a left chamber flows to the right arm and, consequently, some of the liquid in the left chamber is entrained into the right arm. Conversely, all of the liquid in the right chamber enters the right arm. The overall effect of this phenomenon is to force the liquid phase to split in nearly equal proportion as the gas phase split to each arm.

2. Nozzles inserted in the outlet branches of the tee. For example, a gas phase set to a 30%–70% split with the higher amount going to the right arm will encounter a restricted diameter at the nozzle inlets thus causing turbulence and promoting the mixing of the gas and liquid phases within the tee junction. Because the nozzles are located directly downstream of the tee junction, liquid is entrained more effectively by the gas streams as they exit the junction.

3. Increasing the size of the pipe tee to reduce the inlet vapor velocity to below 20 ft/sec. By increasing the tee diameter above that of the inlet pipe upstream and outlet pipes downstream of the tee, the vapor velocity is reduced sufficiently to allow the liquid phase to segregate toward the bottom of the tee. Consequently, the vapor phase exiting each arm entrains a proportional amount of the liquid phase.

Preferably, for maximum effectiveness of controlling two-phase flow splitting over a wider range of conditions (e.g., mass flow rate, quality, liquid volume fraction, pressure), the pipe tee is modified with a combination of one or more of the methods described above.

Further objects and advantages of the present invention will become apparent from the following detailed description, taken in conjunction with the accompanying drawings which are an integral portion of the specification.

BRIEF DESCRIPTION OF THE DRAWINGS

In order to assist the understanding of this invention, reference will now be made to the appended figures (or drawings). The figures are exemplary only, and should not be construed as limiting the invention.

FIGS. 4A to 4H are cross sectional views which schematically illustrate eight different embodiments of impacting tees evaluated during the air-water laboratory tests. The tees depicted in FIGS. 4F, 4G, and 4H have been found to be substantially more effective to assure equal vapor-liquid (or gas-liquid) ratio splits to each exit arm. FIG. 4E illustrates an embodiment that has been found to be effective in assuring equal vapor-liquid (or gas-liquid) ratio splits to each exit arm. FIGS. 4A through 4D illustrate embodiments of impacting tees that were unable to provide equal quality (vapor-liquid ratio) splits to each exit arm.

FIG. 5A illustrates the liquid and vapor flow split using a pre-separator vane inserted in the inlet arm of the impacting tee. FIG. 5B illustrates the liquid and vapor flow split using nozzles inserted in the exit arms of the impacting tee.

FIGS. 9A through 9C are plots showing the air-water splits to each exit arm for a normal impacting tee depicted in FIG. 4A and for the preferred embodiments depicted in FIGS. 4F through 4H at three different air velocities and a liquid volume fraction equal to 0.02 entering the tee junction.

FIG. 12A shows vapor and liquid phase splitting for steam flow through a 2-inch diameter normal impacting tee. FIG. 12B shows vapor and liquid phase splitting for steam flow through a 4-inch diameter normal impacting tee.

DETAILED DESCRIPTION OF PREFERRED EMBODIMENTS

In its broadest aspect, the present invention involves mechanical modification of a normal impacting pipe tee to maintain uniform distribution of the vapor to liquid ratios of a two-phase fluid entering and exiting the tee junction.

Figure 1:
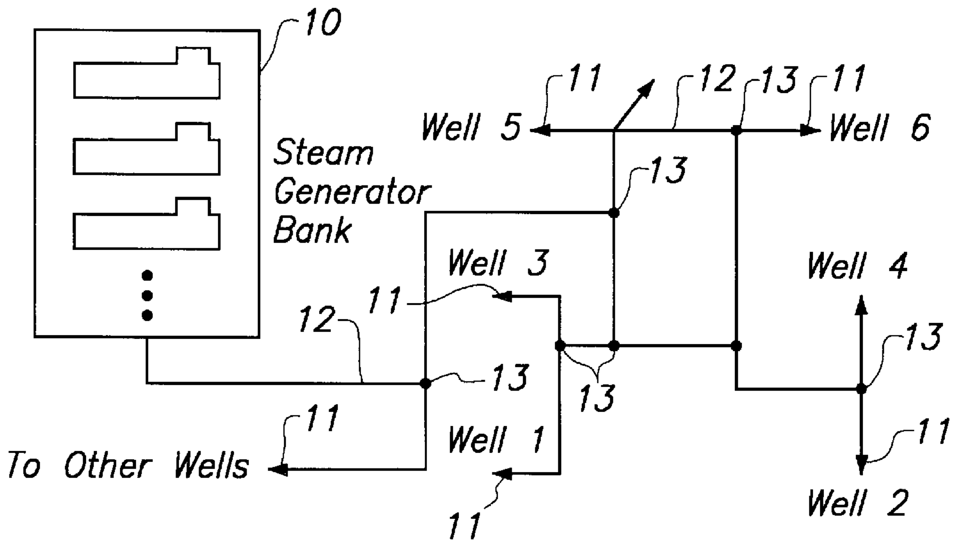
FIG. 1 is a schematic of a typical piping network incorporating a plurality of impacting tee junctions to distribute two-phase steam from a generator plant to a plurality of injection wells.
Figure 2A:
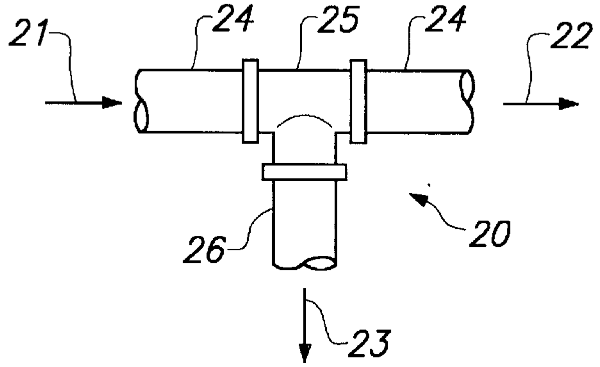
FIGS. 2A and 2B illustrate the side-arm tee and impacting (or dead-end) tee configurations, respectively.
Figure 2B:
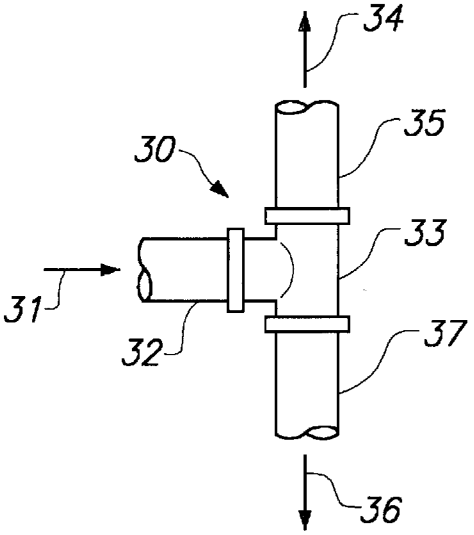

Referring now to the drawings, FIG. 1 illustrates schematically, a steam distribution system for assisted oil recovery using a steam generator bank 10 supplying a multiplicity of wells 11 through a piping network consisting of a plurality of flow lines 12 and impacting tees 13. Flow configurations through a side-arm tee 20 and an impacting tee 30 are depicted in FIGS. 2A and 2B. As indicated by flow arrows 21, 22 and 23 in FIG. 2A, the primary feed of two-phase fluid 21 enters the straight-through arm 24 with a portion of the two-phase flow 23 diverted (or separated) at tee junction 25 through side-arm (or branch) 26 and the remainder of the two-phase flow 22 remaining in the straight-through arm 24. In contrast, two-phase flow through the impacting or dead-end tee 30 shown in FIG. 2B consists of the primary feed of two-phase fluid 31 flowing through inlet arm 32 and entering the tee junction 33 with a portion of the two-phase fluid 34 then diverted through exit arm 35 and the remainder of the two-phase fluid 36 diverted through exit arm 37.

While the impacting tee configuration of FIG. 2B is substantially better in splitting two-phase flow than the side-arm tee configuration of 2A, the impacting tee is generally only capable of splitting the vapor and liquid phases to maintain uniform vapor-liquid ratios for a very narrow range of inlet flow conditions (e.g., vapor velocity, liquid volume fraction, and pressure).

Figure 3:
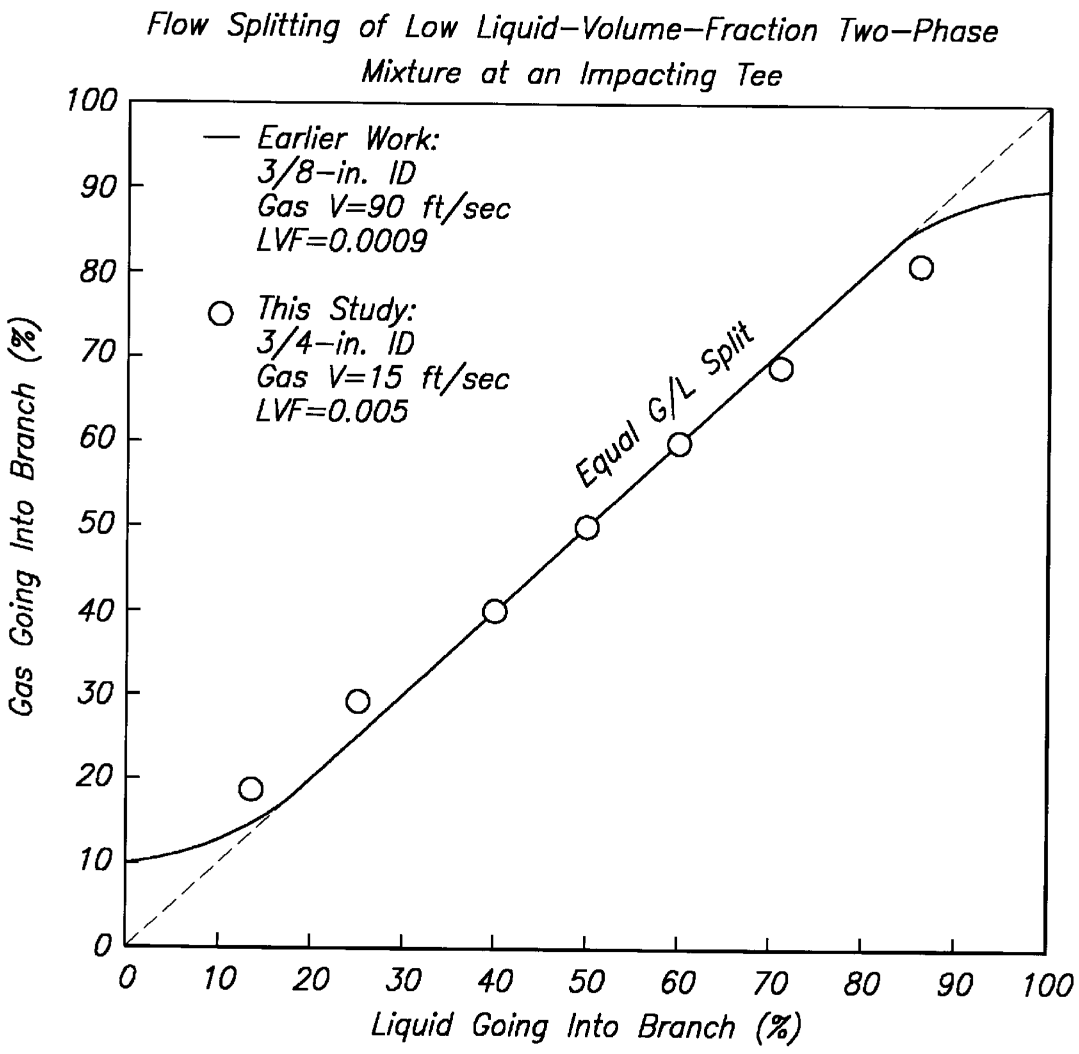
FIG. 3 is a plot showing the proportions of gas to liquid flow splits using a normal impacting tee in accordance with current field practice at two different vapor velocities and very low liquid volume fractions (0.005 and 0.009) entering the tee junction.

FIG. 3 particularly illustrates in graphic form the very low range of inlet liquid volume fractions (LVF) for which uniform splitting of the gas and liquid phases occurs at a normal impacting tee. The departure from uniform gas-liquid (or vapor-liquid) splits over a wide range of inlet vapor velocities (15 ft/sec to 75 ft/sec) is shown in FIGS. 7A through 7D. Similarly, the departure from uniform gas-liquid splits for a wide range of inlet liquid volume fractions (0.005 to 0.05) is clearly shown in FIGS. 8A and 8B.

In accordance with the present invention, a plurality of flow splitting devices were developed to improve the gas-liquid (or vapor-liquid) split ratios exiting an impacting tee having at least two branch streams or pipe arm portions over an extended range of vapor (or gas) velocities and liquid volume fractions entering the tee. The cross-sectional features of these devices (or modified tees) are illustrated schematically in FIGS. 4B through 4H. All of these devices were tested using the laboratory air-water flow splitting apparatus illustrated schematically in FIG. 6 along with the normal impacting tee configuration having not less than the same cross-sectional areas in a pipe stem portion and the pipe arm portions depicted in FIG. 4A. In addition, field steam flow tests were conducted to further evaluate two of the devices depicted in FIGS. 4F and 4G, which greatly improved air-liquid splits during laboratory testing.

A detailed description of the apparatus and procedures used during laboratory and field testing will now be set forth in the following portion of this specification. In addition, the resulting test data will be described in detail. Reference is made to the inventors' prior technical paper presented at the Society of Petroleum Engineers' (SPE) Western Regional Meeting held in Long Beach, California, Mar. 23–25, 1994, as paper number SPE 27866. The entire content of that paper is incorporated by this reference into this specification.

Laboratory Air-Water Flow Splitting Tests

The laboratory apparatus was constructed of ¾-inch clear Lucite tubing and the different tee configurations were similarly constructed of clear Lucite material such that the two-phase fluid flow was easily visualized, which allowed determination of the flow regime(s) entering and exiting the tee junction and postulation of possible mechanisms for the resulting flow-splitting behavior. These features are not generally available when running high-pressure gas-condensate or wet steam through steel piping networks.

Figure 6:
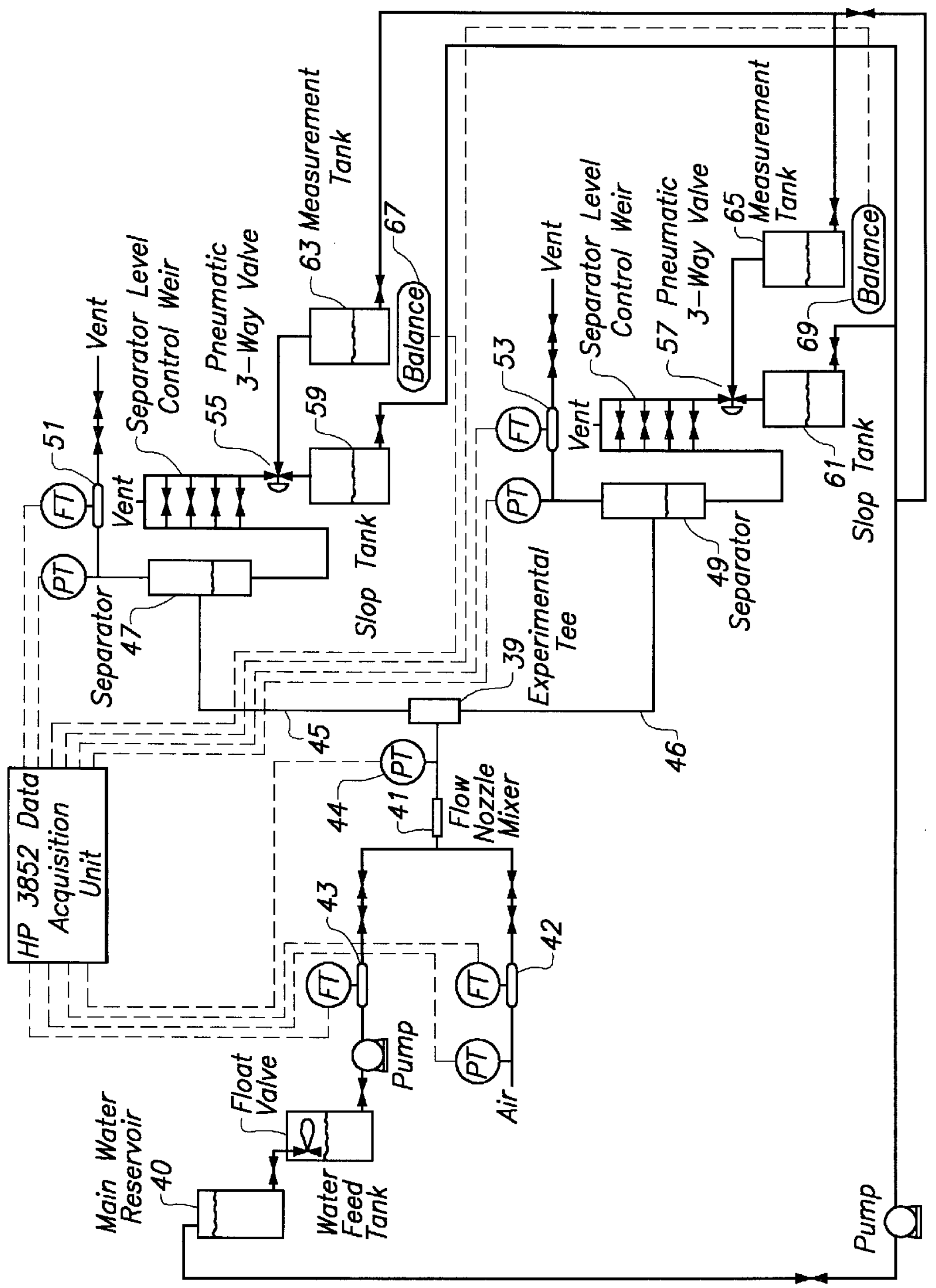
FIG. 6 is a schematic diagram of an experimental test apparatus using air and water to model and evaluate two-phase flow splitting at a normal impacting tee shown in FIG. 4A and various impacting tee embodiments shown in FIGS. 4B through 4H.
Figure 7A:
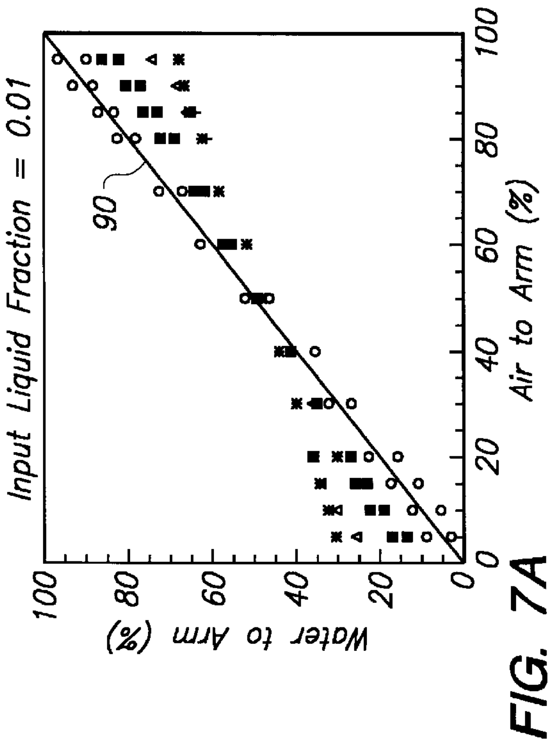
FIGS. 7A through 7D are plots showing the effect of air velocity entering the tee junction on the air-water splits to each exit arm for a normal impacting tee depicted in FIG. 4A. Air-water splits are shown for four different liquid volume fractions and five different air velocities entering the tee junction.
Figure 7B:
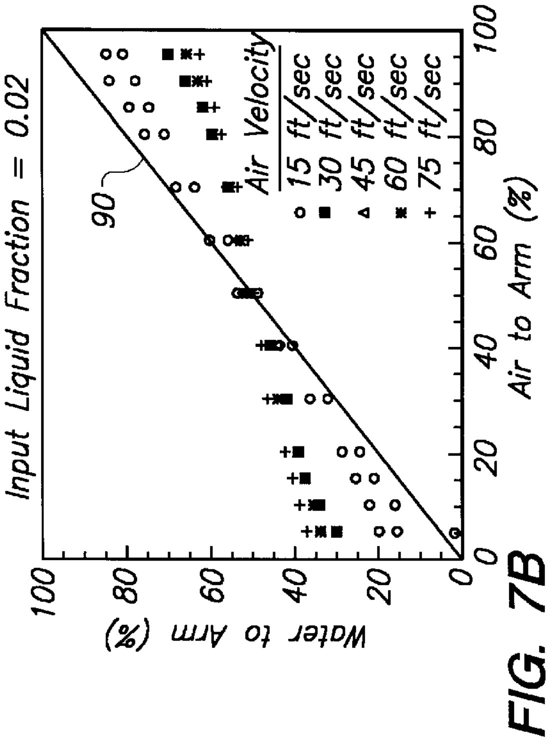
Figure 7C:
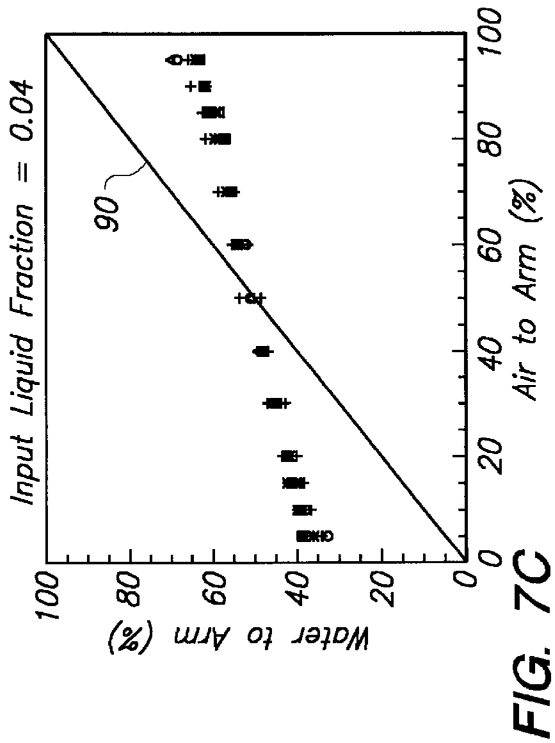
Figure 7D:
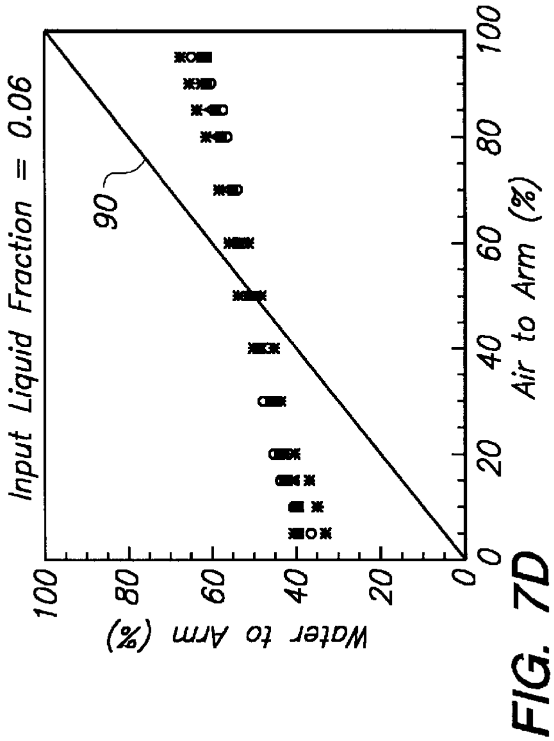

Referring to FIG. 6, air from a constant pressure source (not shown) passed through a flow nozzle mixer 41 at rates controlled by flow transducer/meter 42. Water from a constant fluid-level tank (or reservoir) 40 was pumped into the nozzle/mixer 41 at rates controlled by flow transducer/meter 43 were it was combined with the air. The pressure of the combined two-phase mixture was measured by pressure transducer 44. The dry-air flow rate was varied between 2.76 and 13.81 scf/min and the water rate was varied between 0.014 and 0.881 cf/min. Pressure drop across tee 39 was minimal and inlet air pressures ranged from 15.5 to 22.0 psia depending on the air flow rate. For these ranges of air and water flow rates, the linear air velocity in the ¾-inch Lucite tubing entering the tee 39 ranged from 15 ft/sec to 75 ft/sec and the liquid volume fraction ranged from 0.005 to 0.06. These test conditions are representative of field steam flow rates of 200 to 800 B/D CWE in a 2-inch pipe at steam pressures between 300 to 800 psia and steam qualities ranging from 20% to 80%.

The air-water mixture exited the tee through branches 45 and 46 and the air and water in each branch was separated using cyclone separators 47 and 49 and the air flow rates exiting each separator was controlled and measured using flow rate transducers/meters 51 and 53. For the majority of the tests, the percentage of air split to each branch ranged from 5% to 95%. The water exiting the separators 47 and 49 was bypassed through pneumatic three-way valves 55 and 57 and directed into either a slop tank 59 or 61 before steady-state flow conditions were reached and then directed into a measurement tank 63 or 65 positioned on balances 67 or 69 after steady-state conditions were reached. The average water rate was then determined from the total water weight measured during the elapsed steady-state test interval. In addition, the percent of total water flowing into each branch and the liquid volume fraction exiting to each branch was determined from the weight and elapsed time measurements.

Figure 8B:
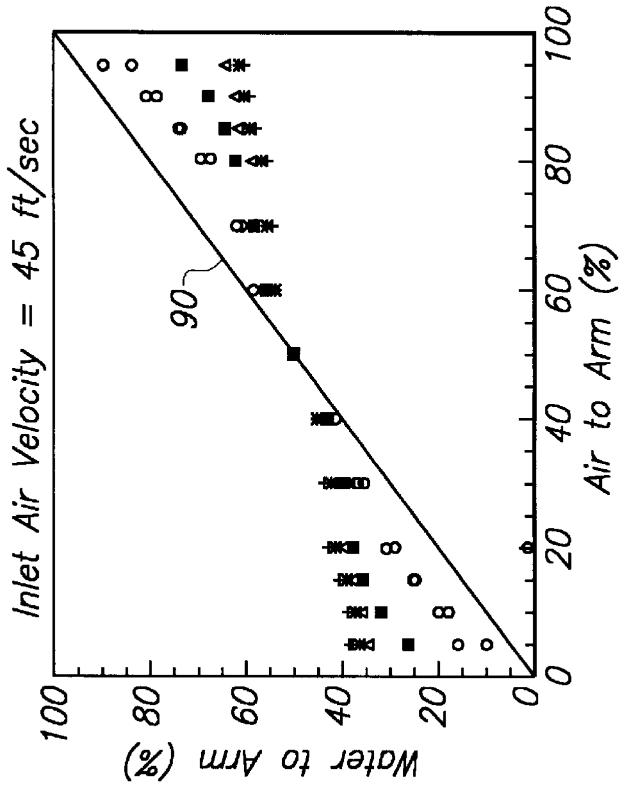
FIGS. 8A and 8B are plots showing the effect of liquid volume fraction entering the tee junction on the air-water splits to each exit arm for a normal impacting tee depicted in FIG. 4A. Air-water splits are shown for five different liquid volume fractions and two different air velocities entering the tee junction.
Figure 8A:
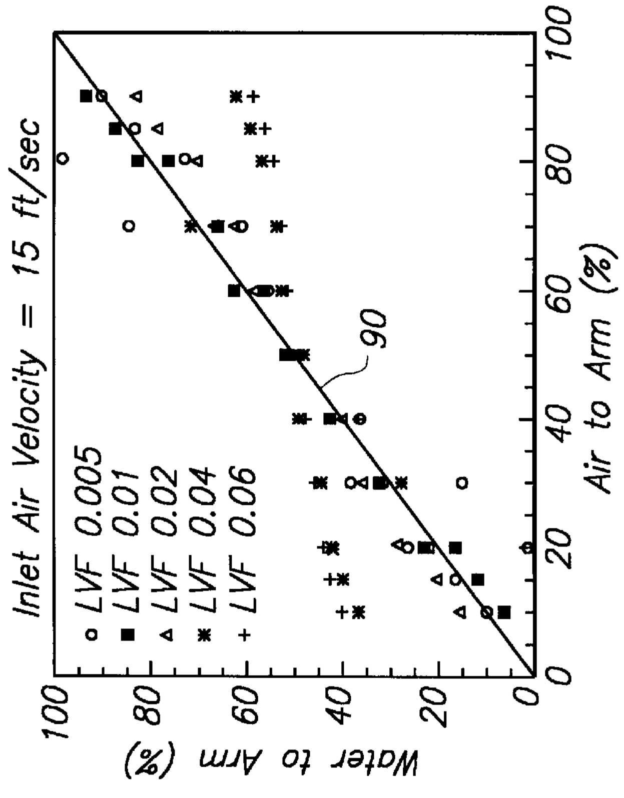

Representative water split versus air split data resulting from the tests are shown graphically in FIGS. 7A through 7D and FIGS. 8A and 8B over a range of inlet air velocities and liquid volume fractions, respectively. Each plot of FIGS. 7A through 7D shows water split versus air split for different upstream (or inlet) air velocities for a fixed upstream (or inlet) liquid volume fraction (0.01, 0.02, 0.04, and 0.06). Conversely each plot of FIGS. 8A and 8B shows water split versus air split for different upstream liquid volume fractions for a fixed upstream air velocity (15 ft/sec and 45 ft/sec). If uniform percentage of air to water (or vapor to liquid) splits were achieved in each exit branch, then the test data plotted in FIGS. 7A through 7D and FIGS. 8A and 8B would lie along a line of symmetry 90 as shown in the referenced FIGS. 7 and 8. However, as seen in FIGS. 7A through 7D and FIGS. 8A and 8B, near uniform air-water splits occur only for upstream air velocities of 15 ft/sec and upstream liquid volume fractions below 0.02. In addition, it can be seen from FIGS. 7A through 7D and FIGS. 8A and 8B that the data increasingly deviate from the symmetry line 90 as the upstream air velocity and upstream liquid volume fraction increase. The data also show that the exit arm receiving the lower percentage of air flow receives a disproportionately higher percentage of water flow and that this effect becomes more pronounced as the inlet air velocity and liquid volume fraction increase.

Several devices inserted within the impacting tee were tested. The resulting modified impacting tee configurations are shown schematically in FIGS. 4B through 4H, along with a normal impacting tee shown in FIG. 4A. The tee modifying devices of FIGS. 4B through 4D, however, did not increase the range of inlet conditions for which the liquid phase splits in the same proportion as the gas phase. Some devices such as the reduced diameter tee of FIG. 4D made the splitting worse than that for the normal impacting tee. The static mixer device of FIG. 4C slightly increased the range for equal gas-liquid splits; however, this device was not considered practical for field use because it significantly increases pressure loss across the tee and is susceptible to plugging with debris or scales flowing in steam lines. The enlarged diameter tee of FIG. 4E also increased the range for equal gas-liquid splits, for low inlet vapor velocities.

Figure 4I:
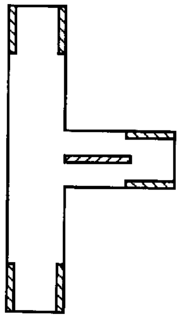
FIGS. 4I to 4K are schematic illustrations of three embodiments of impacting tees having a combination of elements illustrated in FIG. 4E to 4H.
Figure 4J:
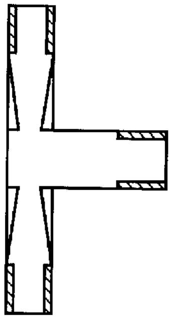
Figure 4K:
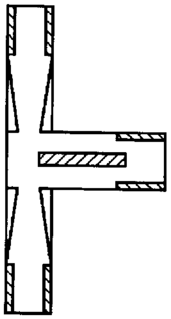

The greatest improvements in gas-liquid flow splitting were obtained with the tee configurations shown in FIGS. 4F, 4G and 4H: (1) separator vane (or septum) of FIG. 4F, (2) downstream nozzles of FIG. 4G, and (3) vane/downstream nozzles combined of FIG. 4H. The test results for selected upstream air velocities and liquid volume fractions are shown graphically in FIGS. 9A through 9C and compare gas-liquid splits for the three improved tee configurations with corresponding splits for a normal impacting tee. As seen in FIG. 9A, the three improved tee configurations do not significantly modify the uniform air-liquid splits obtained at low inlet air velocity and liquid volume fraction (15 ft/sec and 0.01 LVF) because for these conditions, the normal impacting tee already provides uniform vapor-liquid split ratios downstream of the tee. However, they do not make the splits worse than that for a normal impacting tee. The improved tee configuration using the vane/nozzles combination was found to improve the gas-liquid splits at higher inlet air velocities and liquid volume fractions. In addition, using the vane or nozzles alone were found to be effective in increasing the range of equal gas-liquid split ratios. Also, these devices are more simple in design and easier to install in a tee than in combination. Therefore, either the vane or the nozzles device may be more suitable for field use. The configuration of FIGS. 4E, 4F, 4G and 4H can be used singularly or in any combination of two or more combinations, such as, but not limited to, 1) the enlarged diameter tee of FIG. 4E combined with the vertical partition of FIG. 4F, 2) the enlarged diameter tee of FIG. 4E combined with the flow restricting devices of FIG. 4G, 3) the enlarged diameter tee of FIG. 4E combined with the combination of vane and nozzles of FIG. 4H, or 4) the vane of FIG. 4F combined with the flow restricting devices of FIG. 4G. The schematic representation of the two-phase flow patterns observed during the vane and nozzles tests helps to explain why these tee devices increase the range of equal gas-liquid split ratios. The phenomena described below were observed for all flow conditions, except those in which the gas splits exceed a 20%–80% split or a 80%–20% split.

Figure 5A:
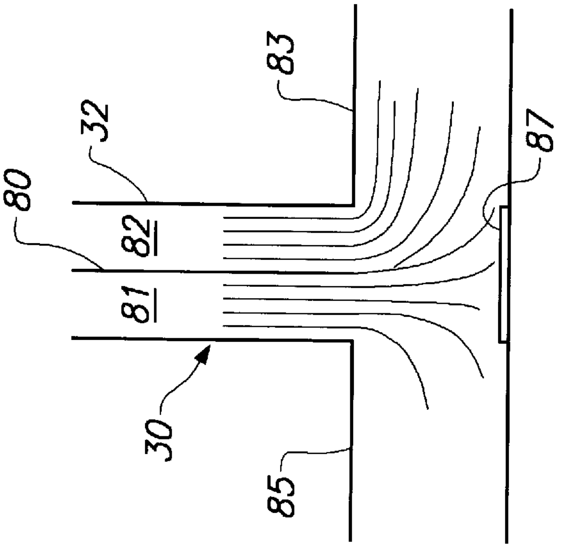
FIGS. 5A and 5B show schematic representations of the liquid and vapor flow splitting for two of the preferred embodiments of the present invention for a 30%–70% vapor rate split.

With a separator vane 80 inserted in the tee as shown in FIG. 5A, the gas and liquid are divided approximately equally into the upstream chambers 81 and 82 as they enter the tee junction. With the 70%–30% gas split depicted in FIG. 5A, approximately 40% of the gas in the left chamber 81 is forced into the right exit arm 83 and this causes some of the liquid in the left chamber 81 to also be redirected into the right exit arm 83. In addition, all of the liquid in the right chamber 82 enters the right exit arm 83 because the gas entering the right arm from the left chamber prevents it from entering the left exit arm 85. The overall result is to split the liquid phase nearly proportionally to that of the gas phase.

Referring to FIG. 5A, the separator or insert 80 is relatively thin as compared to the diameter of the inlet leg 32 of the tee 30. However, the vane or separator 80 has to be substantial enough to not tear out under high flow velocity and extreme conditions. Generally, the thickness of the separator 80 will be equal to the wall thickness of the pipe because thicker walled pipe can withstand harsher conditions. Therefore, for ⅛ inch thick pipe the separator thickness will be ⅛ inch thick. The separator extends co-axially along inlet leg 32 for a length several times the leg diameter. The separator need only be long enough to create the mixing conditions described above. Generally speaking, for a two inch diameter tee, the separator will be at least six inches in length.

The longitudinal edges of separator 80 can be glued, welded, wedged or threaded into the tee depending on the composition of the tee leg. Preferably, the separator terminates at the junction of inlet leg 32 with right exit arm 83 and left exit arm 85. However, the separator extends into the intersecting diameters of the exit arms.

Figure 5B:
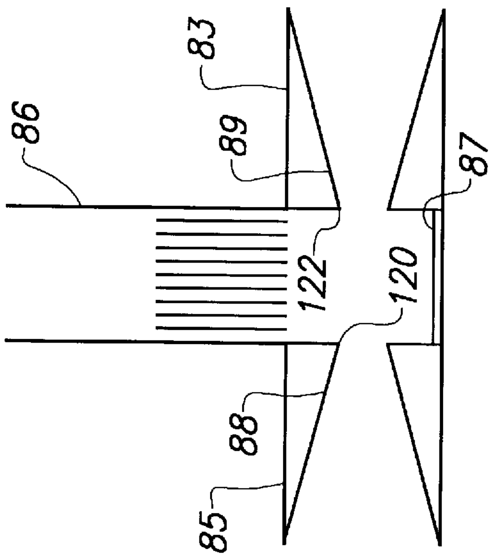

The downstream nozzles 88 and 89 appear to work on a somewhat different principle. As shown in FIG. 5B for a 70%–30% gas split, the liquid impinges upon the dead-end wall 87 having an impact surface whose area is not greater than the cross-sectional area of the inlet arm, opposite the inlet arm 86 and, consequently, generates a swirling motion that causes the liquid to mix more uniformly with the gas and allows the liquid to split more equally with the gas phase to exit arms 83 and 85 which each has a cross-sectional area not greater than the cross-sectional area of the inlet arm.

With reference to FIG. 5B, the nozzles 88 and 89 have nozzle inlets or orifices 120 and 122 which are located in an imaginary plane that extends from each side wall of inlet leg 32. In other words, the orifices 120 and 122 are located right at the start of exit arms 83 and 85. The size of the orifices or nozzle inlets are chosen such that they create a swirling motion in the tee junction without being so small as to create a choking effect that causes a pressure drop and without being so large as to not create a sufficient swirling or turbulent motion in the tee junction. Generally, the tee will have a beta ratio in the range of 0.3 to 0.8 where $$\text{beta ratio} = \frac{\text{orifice diameter}}{\text{pipe diameter}}$$

A nozzle configuration is preferred in this embodiment. However, any flow restriction device that creates the desired swirling or turbulence in the tee junction can be used. Each nozzle or flow restriction device can be glued, welded, wedged or threaded into the tee depending on the composition of the tee leg. As with the separator, the nozzle or flow restriction device has to be substantial enough to not be dislodged under extreme conditions in the tee.

Field Steam Flow Tests

Figure 10E:
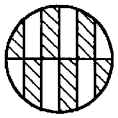
FIG. 10E is a cross-sectional view taken along line A—A of FIG. 10B.
Figure 10F:
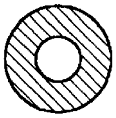
FIG. 10F is a cross-sectional view taken along line A—A of FIG. 10C.
Figure 10G:
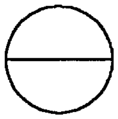
FIG. 10G is a cross-sectional view taken along line A—A of FIG. 10D.
Figure 10B:
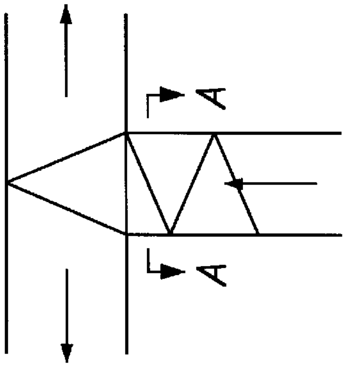
FIGS. 10A through 10D are schematic illustrations of four different embodiments of impacting tees evaluated during the field steam flow tests. The tees depicted in FIGS. 10C and 10D were found to be substantially more effective to assure equal vapor-liquid ratio splits to each exit arm.
Figure 10D:
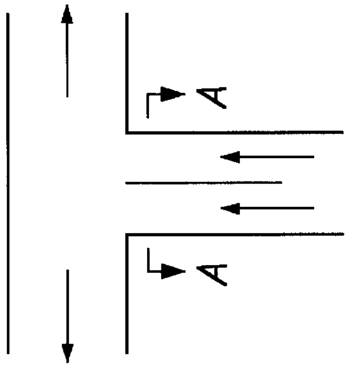
Figure 10A:
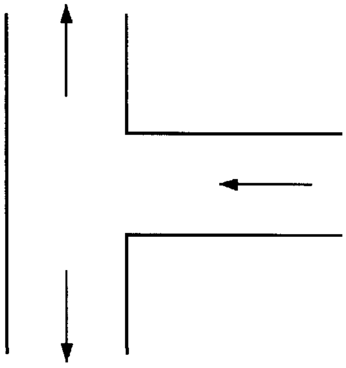
FIG. 10A (PRIOR ART)
Figure 10C:
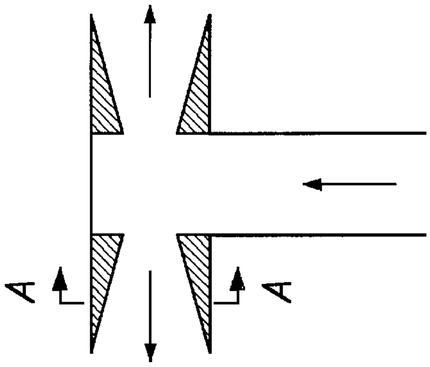

In accordance with the present invention, field tests were conducted to evaluate two-phase steam flow splitting through four different impacting tee designs: (1) normal impacting tee (FIG. 10A), (2) static mixer stratifier tee (FIG. 10B), (3) nozzle reducer tee (FIG. 10C), and pre-separator vane tee (FIG. 10D). The nozzle reducer and pre-separator vane tees were constructed such that they were representative of the laboratory scale devices depicted in FIG. 4F and 4G. The static mixer stratifier tee was an off-the-shelf impacting tee as disclosed in U.S. Pat. No. 4,824,614, issued to Jones.

The main objectives of the field tests were to:

1. Determine the range of steam conditions under which equal quality splits occur;
2. Compare field two-phase steam data with laboratory air-water data to see if comparable flow-split behavior are observed for comparable flow conditions; and
3. Evaluate the performance of the different tee insert devices.

Figure 11:
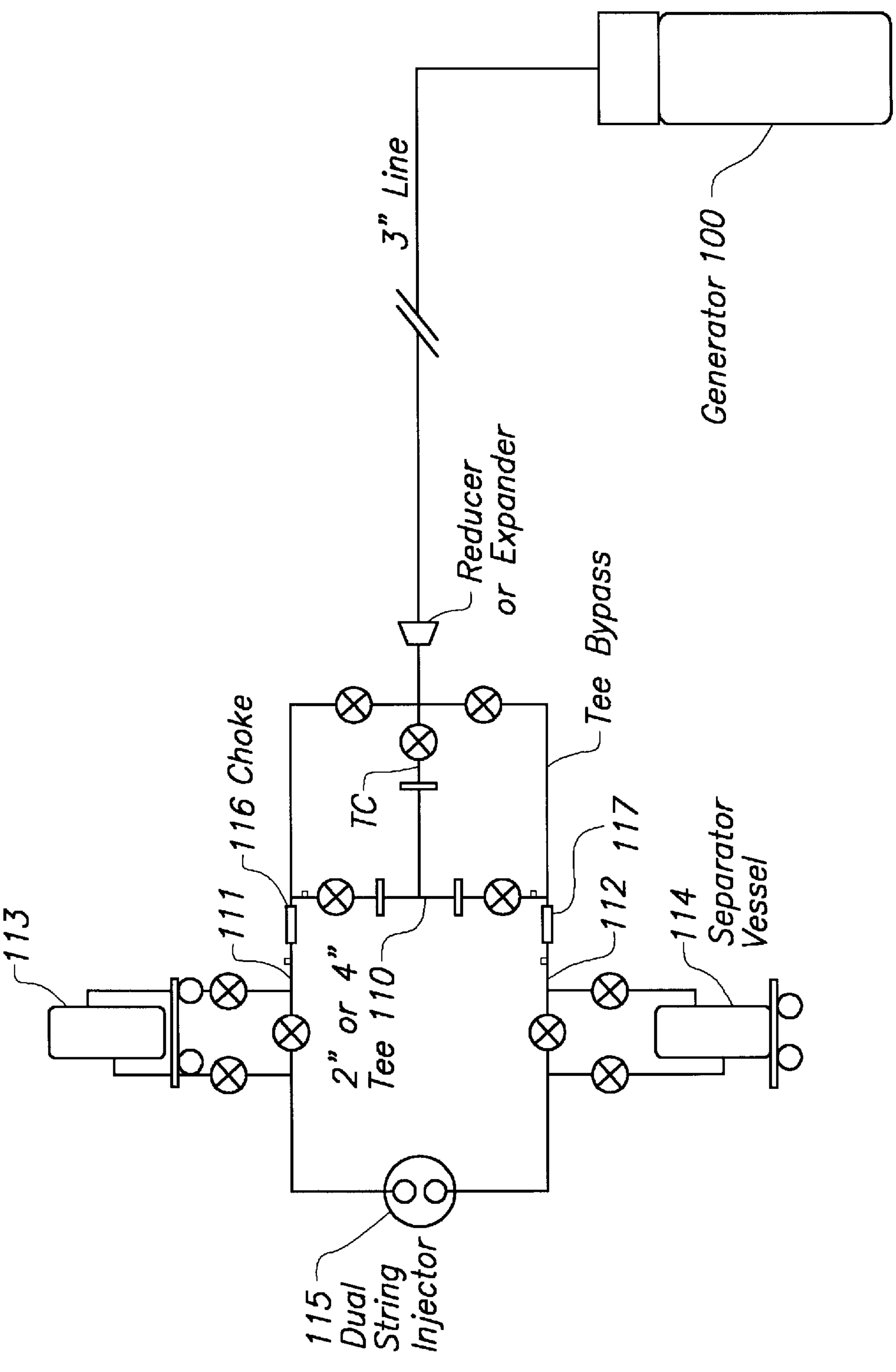
FIG. 11 shows a schematic of the field apparatus used to conduct the two-phase steam flow splitting tests.

Referring to FIG. 11, two-phase steam from a generator 100 was directed through an impacting tee 110 and the rates and qualities of split streams 111 and 112 were metered with separator vessels 113 and 114 and injected into a nearby dual-string well 115. The flow rates of the split streams exiting the tee were controlled using wellhead critical flow chokes 116 and 117. Metal sheathed Type E thermocouples were installed upstream of the tee junction and upstream and downstream of each choke to monitor steam temperatures (and consequently, saturation pressures). Critical flow was achieved at each choke to maintain stable test conditions during testing and data were collected for at least 30 minutes (under stable conditions) before changing to the next test case.

The impacting tee was flanged and bypass lines were used for safe and easy removal and insertion of the different tee designs. Two-inch and four-inch nominal diameter pipe tees were used to provide an extended range of inlet vapor velocities. Steam quality (or vapor mass fraction) entering the tee was varied by adjusting the fuel and feedwater rates at the generator. A minimum of nine separate tests (a combination of three inlet qualities and 3 outlet vapor flow splits) were run for two different tee diameters (two-inch and four-inch) for a total of 18 tests. In addition, some of the test cases were repeated to ensure that the results were consistent and reliable. The two-phase steam conditions achieved during testing ranged from 5 ft/sec to 70 ft/sec vapor velocity and 0.01 to 0.10 liquid volume fraction entering the tee. These conditions were comparable with those obtained during the laboratory air-water tests previously described.

The vapor velocity and liquid volume fraction of the steam entering the tee was determined from the generator feedwater rate and from steam quality and temperature measured upstream of the tee. The steam flow rates and qualities split to each exit branch of the tee were determined from separator vapor and liquid flow rate measurements. The separator data were adjusted to pressure conditions upstream of the choke to correct for liquid flashing as a result of the large pressure drop across the choke. Isenthalpic throttling across each choke was assumed to obtain steam qualities at upstream pressure conditions. The total adjusted liquid and vapor flow rates exiting the tee were then compared with the generator output data to ensure that the steam mass flow and thermal energy were balanced for the system. The adjusted separator data were then used in all subsequent analyses to determine the vapor velocities and liquid volume fractions entering the tee and the percent vapor and liquid splits exiting each branch of the tee.

The resulting steam flow split data were evaluated in two stages: 1) the data for the normal impacting tee were reviewed to establish the conditions in which equal vapor-liquid ratios (or qualities) were split to each branch and the results were compared to the laboratory air-water data to check for consistency in the basic dynamics of two-phase flow; and 2) the data for the modified tee designs were evaluated to determine which insert device(s), if any, provided improved quality splits over an extended range of inlet flow conditions. The results of the pre-separator vane and nozzle reducer tees were also compared with the laboratory findings.

1. Normal Impacting Tee

Figure 12A:
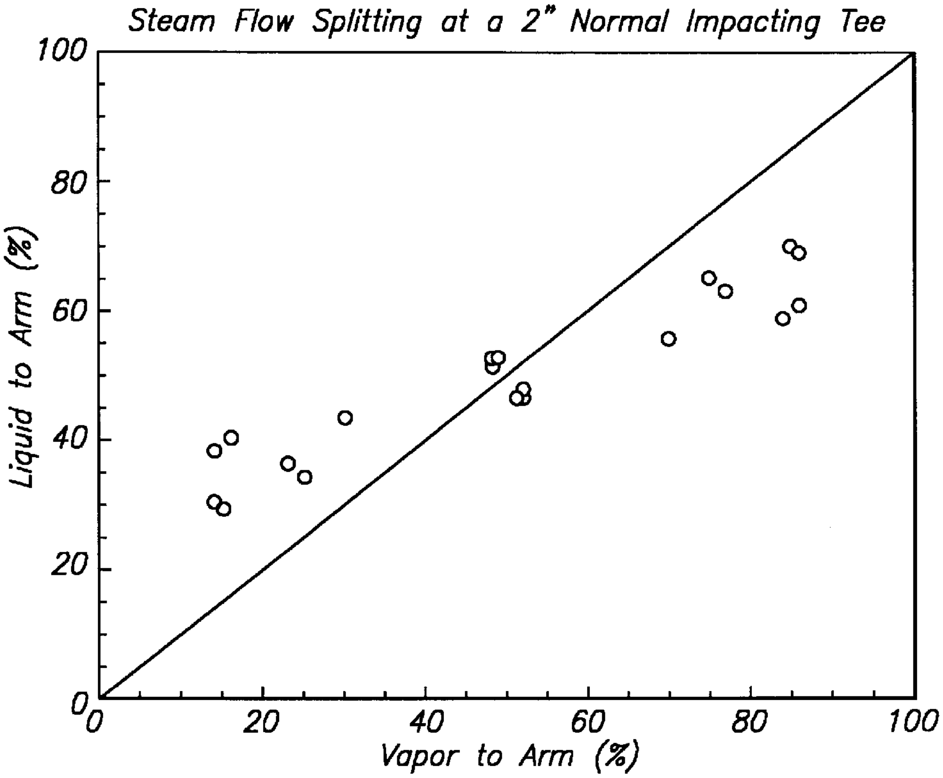
FIGS. 12A and 12B show liquid and vapor splits for two-phase steam flowing through a normal impacting tee depicted in FIG. 10A.
Figure 12B:
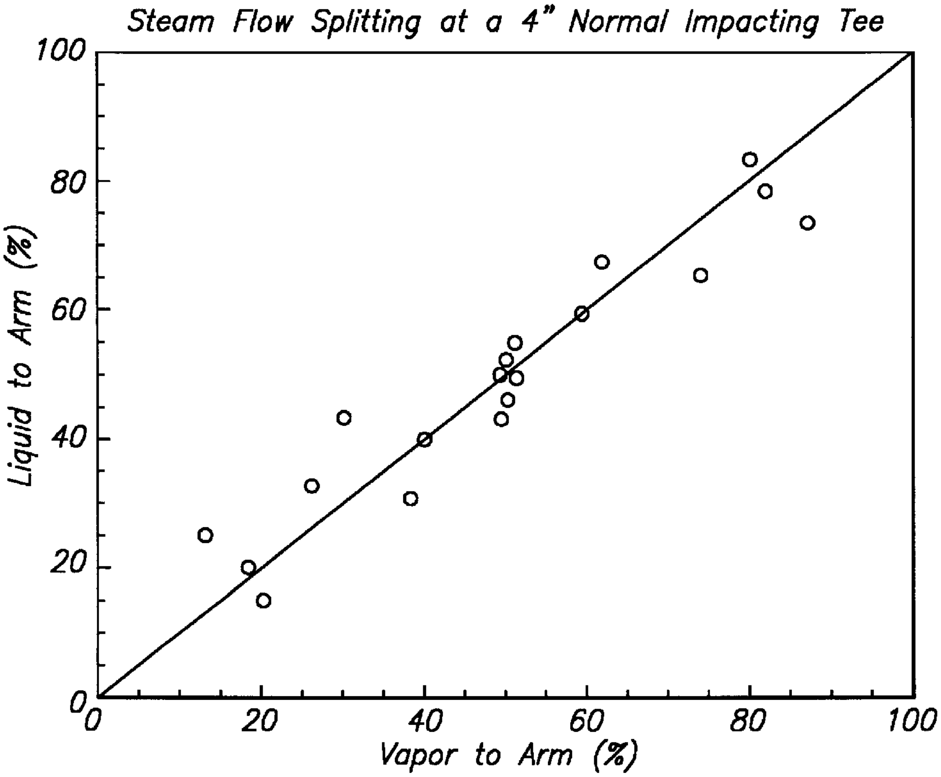

The liquid-phase split versus vapor-phase split data are shown graphically in FIGS. 12A and 12B for two-inch and four-inch tees, respectively. The two-inch tee data plotted in FIG. 12A clearly show that uneven or non-uniform liquid to vapor splits occur once the vapor split to the exit arms deviates from 50%—50%. The data also show that the exit arm with the lower percentage of vapor flow receives a disproportionately higher percentage of liquid flow. These findings are very consistent with the laboratory air-water test results. The four-inch tee data plotted in FIG. 12B show that the liquid and vapor phases split proportionately to each arm for nearly the entire range test conditions. It should be noted that the vapor velocity entering the four-inch tee ranged from 5 ft/sec to 20 ft/sec. Therefore, it can be concluded from the four-inch tee data that equal quality splits can be obtained when the vapor velocity entering the tee is below 20 ft/sec. This velocity effect was also observed in the laboratory air-water tests; however, it may not always be practicable or cost effective to install enlarged diameter tees in field distribution networks.

2. Modified Impacting Tees

Comparison of liquid-phase versus vapor-phase splits for normal and modified impacting tees are shown in FIGS. 13A through 13C and FIGS. 14A and 14B. The data for the two-inch and four-inch diameter tees were evaluated separately to isolate the effects previously observed at lower inlet vapor velocities.

Figure 13B:
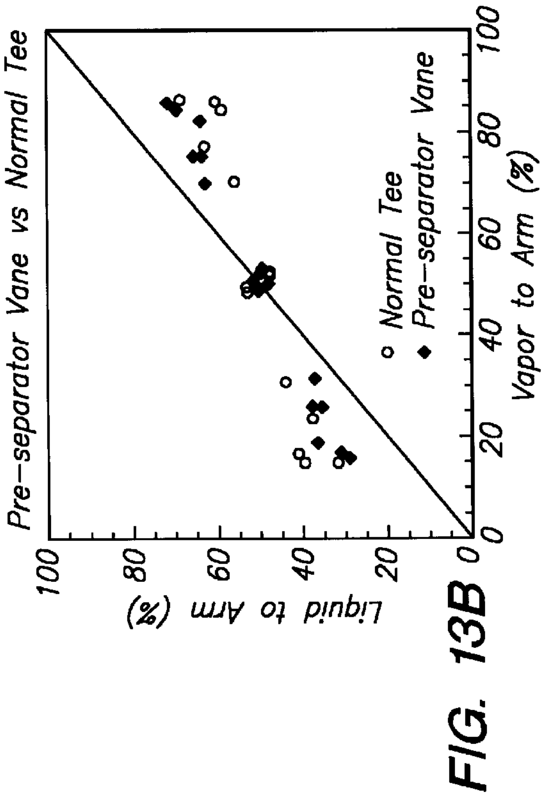
FIGS. 13A through 13C show a comparison of liquid-phase versus vapor-phase splits for two-phase steam flowing through a 2-inch diameter normal impacting tee depicted in FIG. 10A with splits resulting from the use of 2-inch diameter modified tee configurations depicted in FIGS. 10B through 10D.
Figure 13A:
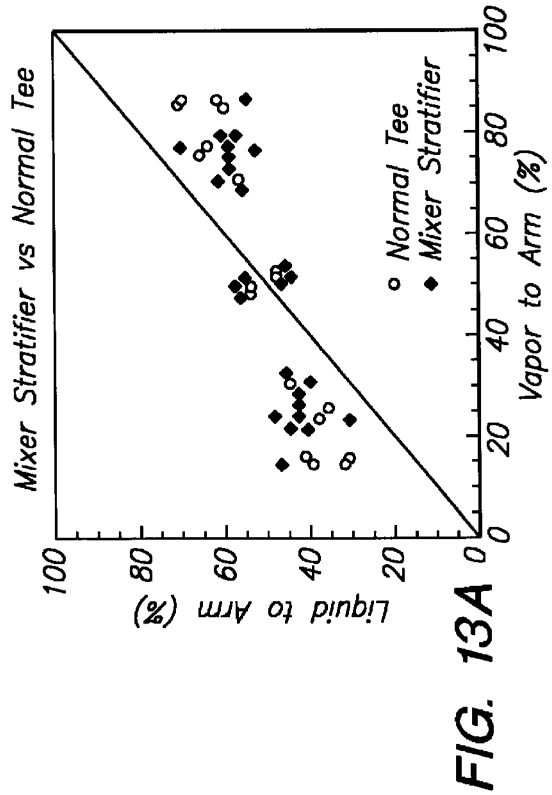
Figure 14A:
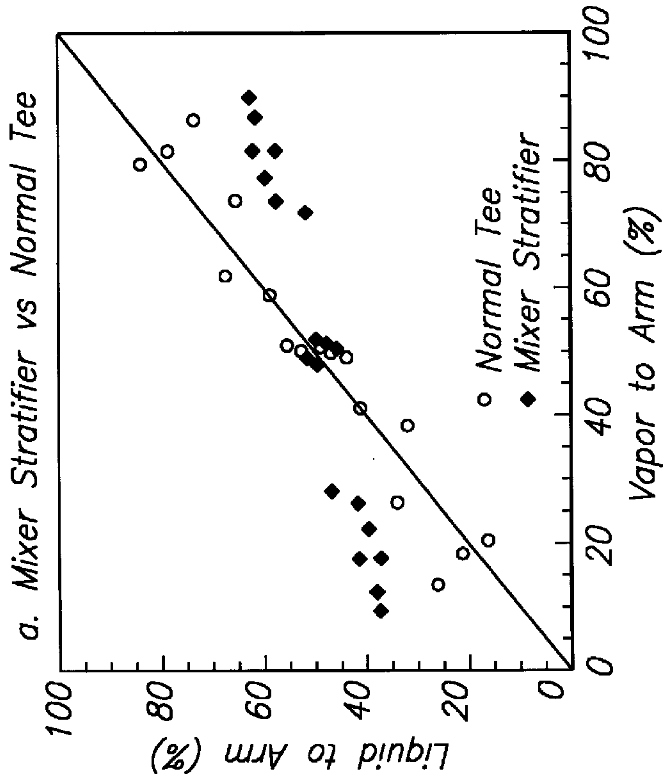
FIGS. 14A and 14B show a comparison of liquid-phase versus vapor-phase splits for two-phase steam flowing through a 4-inch diameter normal impacting tee depicted in FIG. 10A with splits resulting from the use of 4-inch diameter modified tee configurations depicted in FIGS. 10B and 10D.

Comparison of the liquid-phase versus vapor-phase split data for normal and mixer stratifier tees are plotted in FIGS. 13A and 14A. As shown in FIG. 13A for the two-inch diameter normal and mixer stratifier tees, the mixer stratifier insert does not improve the liquid-phase splits to each arm and, in fact, tends to split the liquid-phase equally to each arm independently of the vapor-phase split. This is further illustrated for the four-inch diameter normal and mixer stratifier tee data plotted in FIG. 14A. At lower inlet velocities obtained with the four-inch tees, it is even more apparent that the mixer stratifier insert device tends to split the liquid-phase equally, regardless of the vapor-phase split.

Figure 14B:
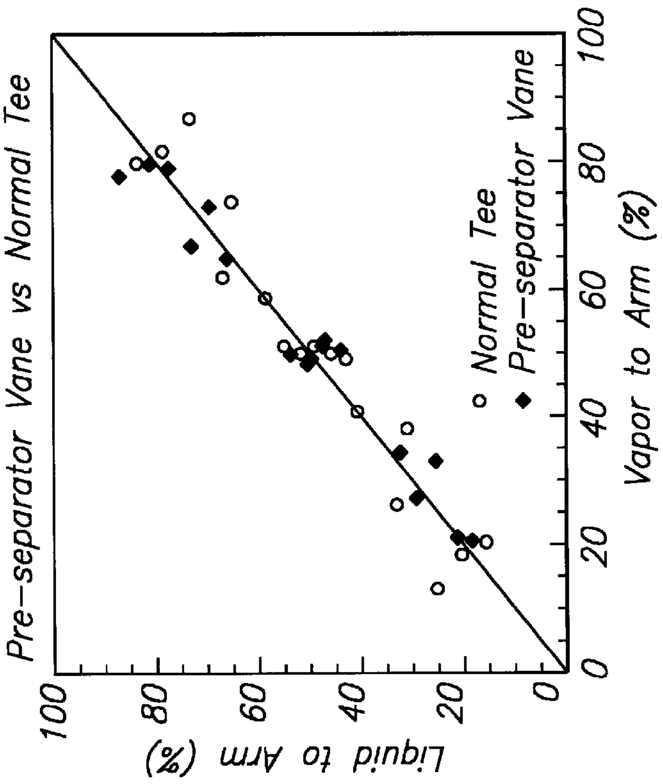

Comparison of the liquid-phase versus vapor-phase split data for normal and pre-separator vane tees are plotted in FIGS. 13B and 14B. As shown in FIG. 13B for the two-inch diameter normal and pre-separator vane tees, the vane insert slightly improves the liquid-phase splits to each arm. This was also observed at lower inlet velocities obtained with the four-inch tees, as shown in FIG. 14A.

Figure 13C:
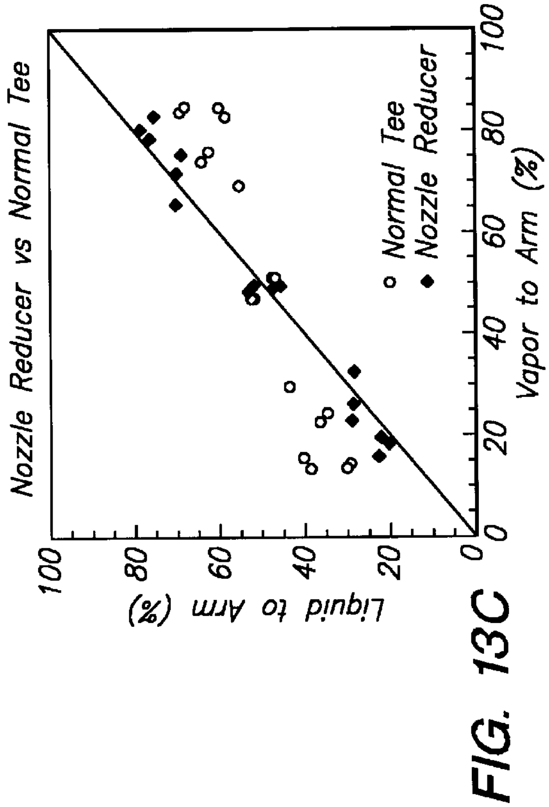

Comparison of the liquid-phase versus vapor-phase split data for normal and nozzle reducer tees is shown in FIG. 13C. The data clearly indicate that the nozzle reducer inserts greatly improves the liquid-phase splits to each arm. Indeed, the percentage of liquid and vapor split to each arm are nearly proportional for all test conditions. The four-inch nozzle reducer tee was not tested because the four-inch normal tee already had a reduced section approximately two feet downstream of the tee junction. Therefore, testing of the four-inch tee with reducer nozzles would have been somewhat redundant.

The improved liquid-phase splits observed for the pre-separator vane and nozzle reducer tee inserts were very consistent with results obtained from laboratory air-water tests. For low inlet vapor velocity (less than 20 ft/sec), proportional liquid-vapor splits were obtained for the normal, pre-separator vane, and nozzle reducer tees. At higher inlet vapor velocities (greater than 20 ft/sec), the nozzle reducer tee performed slightly better than the pre-separator vane tee and maintained proportional vapor-liquid splits to each arm.

In general, the following conclusions can be drawn from the wide range of two-phase flow data obtained from laboratory air-water and field steam flow tests of normal and modified impacting tee designs:

1. Laboratory air-water and field two-phase steam test data were found to be in good agreement, indicating that air-water mixtures behave like wet steam (or vice versa) for comparable vapor velocities and liquid volume fractions.
2. Normal impacting tees split the liquid-phase disproportionately to the vapor-phase when the percentage of vapor split to each branch deviates from a 50%—50% split (or 1:1).
3. The disproportionate vapor-liquid splitting becomes more pronounced as the vapor velocity and/or liquid volume fraction entering the normal impacting tee increases.
4. Reducer nozzles inserted directly downstream of an impacting tee junction greatly improves vapor-liquid splits over a wide range of two-phase flow conditions. For less stringent flow conditions, a pre-separator vane inserted directly upstream of an impacting tee junction can also improve the vapor-liquid splits over that of a normal impacting tee. Accordingly, these devices are considered to be simple and cost effective means for improving vapor-liquid splits at impacting tees and are easily applicable for field distribution networks.

While the present invention has been described with reference to specific embodiments, this application is intended to cover those various changes and substitutions that may be made by those skilled in the art without departing from the spirit and scope of the appended claims.

We claim:

1. An apparatus for dividing flow of a primary stream of a mixture of a gas and a liquid over a wide range of flow conditions into a pair of branch streams or pipe arm portions, having substantially the same mixture of gas and liquid as said primary stream, which apparatus comprises:

a pipe tee connector having not less than the same cross-sectional areas in a pipe stem portion and the two pipe arm portions forming said pipe tee connector;

means for mixing flow in a tee junction of said mixture of said primary stream through said pipe tee connector from said pipe stem portion to both of said pipe arm portions for flow into said branch streams, said flow mixing means approximately equally dividing the flow of the gas and liquid components of said primary stream, the flow mixing means selected from the group consisting of (1) a vane member extending axially within said pipe stem portion and terminating at an intersection of the pipe stem portion with the tee junction, and (2) a flow restricting device within each of said pipe arm portions in combination with (1) for flow mixing through said pipe tee connector.

2. An apparatus in accordance with claim 1 wherein the vane member in the pipe stem portion of the pipe tee connector forms two upstream chambers as the mixture enters the tee junction with the overall effect of forcing the liquid phase to split in nearly equal proportion as the gas phase split to each branch stream of the pipe tee connector.

3. An apparatus in accordance with claim 1 wherein the pipe tee connector has a larger cross-sectional area in the tee junction with respect to the cross-sectional areas of the pipe stem and pipe arm portions, respectively, whereby the vapor velocity entering the tee junction is reduced to below 20 ft/sec and the inside diameter of the tee junction is greater than the inside diameter of an inlet pipe upstream and outlet pipes downstream of the tee junction reducing the inlet vapor phase velocity sufficiently to allow the liquid phase to segregate toward the bottom of the tee junction and, consequently, the gas phase exiting each branch of the tee connector entrains a proportional amount of the liquid phase.

4. an apparatus in accordance with claim 1 wherein said vane member is a vertical flow partition which forms two upstream chambers as the mixture enters the tee junction with the overall effect of forcing the liquid phase to split in nearly direct proportion to the gas split to each pipe arm of the pipe tee connector.

5. An apparatus for dividing flow of a primary stream of a mixture of a gas and a liquid over a wide range of flow conditions into a pair of branch streams or pipe arm portions having substantially the same mixture of gas and liquid as said primary stream, which apparatus comprises:

a pipe tee connector having not less than the same cross-sectional areas in a pipe stem portion and the two pipe arm portions forming said pipe tee connector; and a vane member in the pipe stem portion of the pipe tee connector which forms two upstream chambers as the mixture enters a tee junction in combination with a nozzle inserted in each of the pipe arm portions wherein each of said nozzles is located directly downstream of the tee junction and the vane member terminates at an intersection of the pipe stem portion with the tee junction.

6. An apparatus for dividing flow of a primary stream of a mixture of a gas and a liquid over a wide range of flow conditions into a pair of branch streams or pipe arm portions having substantially the same mixture of gas and liquid as said primary stream, which comprises:

a pipe tee connector having not less than the same cross-sectional areas in a pipe stem portion and the two pipe arm portions forming said pipe tee connector wherein the pipe tee connector has a larger cross-sectional area in a tee junction with respect to the cross-sectional areas of the pipe stem and pipe arm portions, respectively, whereby the vapor velocity entering the tee junction is reduced to below 20 ft/sec whereby the tee junction diameter is larger than that of an inlet pipe upstream and outlet pipes downstream of the tee junction in combination with a vane member, in the pipe stem portion which terminates at an intersection of the pipe stem portion with the tee junction of the pipe tee connector, which forms two upstream chambers as the mixture enters the tee junction.

7. An apparatus for dividing flow of a primary stream of a mixture of a gas and a liquid over a wide range of flow conditions into a pair of branch streams or pipe arm portions having substantially the same mixture of gas and liquid as said primary stream, which apparatus comprises:

a pipe tee connector having not less than the same cross-sectional areas in a pipe stem portion and the two pipe arm portions forming said pipe tee connector wherein the pipe tee connector has a larger cross-sectional area in a tee junction with respect to the cross-sectional areas of the pipe stem and pipe arm portions, respectively, whereby the vapor velocity entering the tee junction is reduced to below 20 ft/sec whereby the tee junction diameter is larger than that of an inlet pipe upstream and outlet pipes downstream of the tee junction in combination with a vane member in the pipe stem portion which terminates at an intersection of the pipe stem portion with the tee junction of the pipe tee connector and further in combination with a nozzle in each of the pipe arm portions of the pipe tee connector wherein each of said nozzles is located directly downstream of the tee junction.

8. An apparatus for dividing flow of a primary stream of a mixture of a gas and a liquid over a wide range of flow conditions into a pair of branch streams or pipe arm portions having substantially the same mixture of gas and liquid as said primary stream, which apparatus comprises:

a pipe tee connector having not less an the same cross-sectional areas in a pipe stem portion and the two pipe arm portions forming said pipe tee connector wherein the pipe tee connector has a larger cross-sectional area in a tee junction with respect to the cross-sectional areas of the pipe stem and pipe arm portions, respectively, whereby the vapor velocity entering the tee junction is reduced to below 20 ft/sec whereby the tee junction diameter is larger than that of an inlet pipe upstream and outlet pipes downstream of the tee junction in combination with a vertical partition device in the pipe stem portion which terminates at an intersection of the pipe stem portion with the tee junction of the pipe tee connector and further in combination with a flow restricting device inserted in each of the pipe arm portions of the pipe tee connector wherein each of said flow restricting devices is located directly downstream of the tee junction.

9. An apparatus for dividing flow of a primary stream of a mixture of a gas and a liquid over a wide range of flow conditions into a pair of branch streams or pipe arm portions having substantially the same mixture of gas and liquid as said primary stream, which apparatus comprises:

a pipe tee connector having not less than the same cross-sectional areas in a pipe stem portion and two pipe arm portions forming said pipe tee connector wherein the pipe tee connector has a larger cross-sectional area with respect to the cross-sectional areas of the pipe stem and pipe arm portions, respectively, whereby the vapor velocity entering a junction is reduced to below 20 ft/sec whereby the tee junction diameter is larger than that of the pipe stem portion and pipe arm portions downstream of the tee junction; and a vertical partition device in the pipe stem portion of the pipe tee connector and terminating at an intersection of the pipe stem portion with the tee junction.

10. An apparatus for dividing flow of a primary stream of a mixture of a gas and a liquid over a wide range of flow conditions into a pair of branch streams or pipe arm portions having substantially the same mixture of gas and liquid as said primary stream, which apparatus comprises:

a vertical partition device in an upstream pipe stem portion of a pipe tee connector which terminates at an intersection of the pipe stem portion with a tee junction; and a flow restricting device inserted in each of the pipe arm portions of the pipe tee connector wherein each of said flow restricting devices is located directly adjacent to the tee junction.

* * * * *